United States Patent Office 3,502,422
Patented Mar. 24, 1970

3,502,422
DYE-BATH TREATMENT FOR POLYMERIC
ARTICLES
Robert Miller, Columbia, S.C., and Milton Farber,
Verona, and Daniel Shichman, Cedar Grove, N.J., assignors to Uniroyal, Inc., a corporation of New Jersey
No Drawing. Filed Feb. 17, 1966, Ser. No. 528,076
Int. Cl. D06p 3/02, 5/00
U.S. Cl. 8—4                      31 Claims

ABSTRACT OF THE DISCLOSURE

The present invention relates to a process for dyeing an article shaped from a polymeric composition comprising an inherently undyeable polymer selected from the class consisting of polyolefins or polyesters in admixture with from 0.5 to 10% of a thremoplastic basic nitrogen containing dye receptor polymer, said process comprising exposing said article to an aqueous dye bath containing an anionic dye and a sufficient quantity of selected acids which render the article dyeable with said anionic dye.

---

By this invention fibers and other articles shaped from polymeric mixtures in which the predominating ingredient is polymeric material which is inherently undyeable can be dyed by acid-type (i.e. anionic) dyes to deep shades which are outstanding wash-fast and dry cleaning-fast.

Polyolefins and polyesters are well-known for being inherently undyeable because these polymers either lack polar sites in their respective molecular structures to which dye molecules may become attached, or because they are penetrated by dye molecules only with great difficulty. Various procedures have been recommended for overcoming this defect, because good dyeability is a prerequisite for many commercial applications to which these polymers would otherwise be outstandingly suited.

The best method so far reported for rendering polyolefins and polyesters dyeable involves incorporating lesser amounts, generally between 0.5% and 10%, of a highly basic polymer, for instance a polyvinylpyridine, into the inherently undyeable polymer before the polymeric mixture is shaped into fibers, films, molded parts or other useful forms. After being shaped, the fibers or other formed articles are made permeable to anionic water-soluble dyes, i.e. activated for subsequent dyeing, by exposing them to treatment with an acidic material. Co-pending patent applications Ser. No. 352,317 and Ser. No. 375,328 describe this method of rendering polyester and polyolefin articles, respectively, dyeable.

Although the method described in the said co-pending patent applications works extremely well to render these otherwise inherently undyeable polymeric materials dyeable with acid-type dyes, it does introduce the need for one additional processing step: the activation step. Needless to say, the introduction into a commercial process of any additional manipulation or handling increases the cost of the process.

We have now found a way to obviate this separate activation step. By this invention, acids of suitable types and/or concentrations are added to the aqueous dye bath. These acids will then perform the activation during the dyeing step. The fiber, film, molded or otherwise shaped article made from a polymeric composition which is predominantly an inherently undyeable polymer such as a polyolefin or polyester, but with which has been admixed a minor amount, usually between 0.5% and 10%, of a highly basic polymer, is thus dyed in this dye bath without any prior exposure to an activation step.

Dye baths made with anionic dyes are conventionally acidified with small amounts of such acids as acetic, formic or sulfuric acid in order to assure that the dye receptor will be protonated and thus in suitable form for reaction with the dye. However fibers and other polymeric articles of the type hereinabove described will remain essentially undyed when exposed to such dye baths. On the other hand, when acids of the types and/or in the concentrations called for by this invention are present in an anionic dye bath, the fibers and other polymeric articles of the type hereinabove described, when exposed thereto, are dyed to deep and brilliant hues which are highly wash- and dry cleaning-fast.

It is an object of this invention to provide a method of dyeing fibers, films, molded articles and other shaped articles made of polymeric compositions which are predominantly inherently undyeable polymers, to deep shades with good fastness properties. It is a further object of this invention to accomplish such dyeing with a minimum of process steps. It is a still further object of this invention to accomplish such dyeing with the greatest possible economy. Other objects and advantages of this invention will be apparent to those skilled in the art from a study of this specification.

The inherently undyeable polymeric compositions to which our invention is applicable comprise two major groupings. One of these groupings is the hydrocarbon polymers, principally the polyolefins ,i.e. poly-(1-alkenes) but also copolymers of non-terminal olefins with 1-alkenes and copolymers of two or more 1-alkenes, as well as block and graft copolymers of olefins with each other and with other hydrocarbons. This class would include polyethylene, polypropylene, poly(3 - methylbutene-1, poly(4-methyl-1-pentene), random as well as block copolymers of ethylene and propylene, copolymers of propylene and 3-methylbutene-1, copolymers of propylene and 4-methyl-1-pentene and copolymers of any of these monomers with each other and/or with other copolymerizable monomers. The preferred material is polypropylene, by which we mean any polymer or propylene and any copolymer containing predominately polymerized propylene together with any other comonomer copolymerized therewith.

The other major grouping is inherently undyeable polymeric materials to which this invention is applicable is the polyesters. These are condensation polymers of dihydric alcohols with organo-dibasic acids or the anhydrides thereof, particularly dicarboxylic acids, and self-condensation polymers of omega-hydroxycarboxylic acids. It will be understood that the invention is applicable to all film and fiber-forming polyesters, in which the ester linkages are intralinear, including poly(alkylene alkanedioates), poly(cycloalkylenedimethylene alkanedioates, poly(alkylene arenedioates), poly(cycloalkylenedimethylene arenedioates), and analogous materials. Examples of the above-named polyesters are respectively, poly(ethylene adipate), poly(1,4-cyclohexylenedimethylene adipate) poly(ethylene terephthalate), and poly(1,4-cyclohexylenedimethylene terephthalate). The preferred materials in our invention are poly(ethylene terephthalate), poly(ethylene terephthalate-isophthalate), and poly(1,4-cyclohexylenedimethylene terephthalate).

The highly basic polymers suitable for admixing with the inherently undyeable polymers for the purpose of this invention include the basic nitrogen-containing polymeric materials of any of the following types:

(1) Thermoplastic homopolymers of vinyl-substituted monocyclic and polycyclic pyridine compounds, including quinolines, and thermoplastic copolymers, including graft copolymers, of such compounds with each other and/or with other unsaturated polymerizable compounds. Among the vinylpyridine compounds useful for this purpose in this invention are 2-vinylpyridine, 3-vinylpyridine, 4-vinylpyridine, 3-methyl-6-vinylpyridine, 2-ethyl-5-vinylpyridine, 2-methyl-5-vinylpyridine, 2-ethyl-6-vinylpyridine, 2-isopropenylpyridine, etc. Polymerizable unsaturated monomers with which the vinylpyridine compounds may be copolymerized include other vinylpyridine compounds, acrylic and methacrylic esters typified by ethyl acrylate and methyl methacrylate, vinylaryl hydrocarbons typified by styrene and vinyltoluenes, and olefins and diolefins such as butadiene-1,3. Alternatively, the vinylpyridine compound may be graft-copolymerized by well-known methods with a previously formed linear high polymer, typified by polyethylene, polypropylene, polystyrene, and polybutadiene, or with any of the polyesters described above. It is always desirable that the basic nitrogen-containing polymer contain no more than a minor proportion of non-nitrogen containig material copolymerized with the vinylpyridine compound, since only the basic nitrogen (e.g. pyridine) portion of the polymer additive is active in enhancing the dyeability of the hydrocarbon polymer. Preferred materials of this class for use in this invention are polymers of at least one vinylpyridine compound, by which is meant homopolymers of vinylpyridine compounds such as poly(2-vinylpyridine), poly(4-vinylpyridine), poly(2-methyl-5-vinylpyridine), poly(2-isopropenylpyridine), etc., copolymers of various vinyl-substituted pyridine compounds with each other, such as copolymers of 2-vinylpyridine and 2-methyl-5-vinylpyridine in any desired proportions, copolymers of 2-vinylpyridine with 2-isopropenyl-pyridine in any desired proportions, copolymers of 4-vinylpyridine with 2-vinylquinoline in any desired proportions as well as copolymers of three, four, or more of these polymerizable materials. Also included in the meaning of the term are copolymers of one or more vinylpyridine compounds with other materials copolymerizable therewith, such as styrene.

(2) Thermoplastic polyamides, including condensation polymers of a bifunctional amine with a bifunctional carboxylic acid or the anhydride thereof such as poly(hexamethylene adipamide), poly(hexamethylene sebacamide) as well as linear polyamides formed from cyclic compounds, such as polypyrrolidinone, polycaprolactam, polyenantholactam, and copolyamides such as Zytel 61[1], an interpolymer of hexamethylene adipamide and hexamethylene sebacamide with caprolactam.

Other polyamide materials useful for this purpose in this invention are vinyl polymers with pendant groups consisting of or containing amide groups. These include the hydrocarbyl-substituted poly(vinylpyrrolidinones), e.g., N-vinyl-3-alkylpyrrolidinone, and N-substituted polyacrylamides, e.g., N-butylacrylamide. Copolymers of amide-containing vinyl monomers with other olefinic monomers such as acrylic and methacrylic esters, typified by ethyl acrylate and methyl methacrylate, vinylaryl hydrocarbons typified by styrene and vinyltoluenes, and butadiene-1,3 are also useful for this purpose. Alternatively, the vinylpyrrolidinones or acrylamides may be graft-copolymerized, by well-known methods, with previously formed linear high polymers typified by polyethylene, polypropylene, polystyrene, and polybutadiene, or with the polyesters described above. It is always desirable that the basic polymer contain no more than a minor proportion of material copolymerized with the vinylpyrrolidinones or acrylamides, since only the amide portion of the polymer additive is active in enhancing the dyeability of the hydrocarbon polymer.

(3) Polymeric amine compounds, including condensation polymers in which the amine group is an integral part of the polymer chain as well as addition homopolymers and copolymers wherein pendant groups include or consist of amine groups. Examples of polymeric amine compounds of the first type useful in this invention are the condensation products of epihalohydrins or dihaloparaffins with one or more amine compound, such as the products disclosed in Belgian Patent No. 606,306 as for instance the condensation product of dodecylamine, piperazine and epichlorohydrin. As examples of addition polymers with pendant groups consisting of or containing amines there are the reaction product of a styrene-maleic anhydride copolymer with 3 - (dimethylamino) - propylamine (the reaction product being a polyamino-polyimide), and styrene-allylamine copolymers such as those disclosed in U.S. Patent No. 2,456,428.

Other basic nitrogen polymers which may be used in our invention are polyurethanes, polyureas, poly(vinylcarbazoles), aniline-formaldehyde resins, etc. Furthermore, mixtures of any of the types of basic nitrogen polymers described above may be used in this invention, provided only that they are mutually compatible.

The basic nitrogen polymers employed should not be readily extractable from admixtures thereof with the hydrocarbon polymer or polyester under the conditions of treating and dyeing used. Thus, after a one-hour extraction of the fiber with boiling water at a pH of 3, at least 10% of the originally added nitrogen polymer should remain in the hydrocarbon polymer. The amount of the basic nitrogen polymer added to the hydrocarbon polymer should be sufficient so that it will bind the amount of dye required to produce the shade desired.

The amount of the highly basic polymer added to the inherently undyeable polymeric material is generally such that the resultant mixture contains between 0.5% and 10% by weight of the former, and preferably between 0.5% and 5% by weight of the former. A very desirable embodiment of the invention involves the use of a mixture containing 3% by weight of the highly basic polymer. Thorough dispersion of the highly basic polymer in the inherently undyeable polymer is important if uniform and bright dyeing is to result. Any of the known techniques of solids blending, melt blending or solution blending may be employed to get thorough dispersion.

This intimate blend of polymeric materials is then shaped to the desired article by any of the known shaping means such as melt or solution spinning in the case of fibers, casting or any other known method of film-making in the case of films, extrusion, injection molding, etc. Finishing operations, such as texturizing or crimping in the case of fibers, may then be performed on the shaped articles before dyeing.

Although such shaped polymeric articles which have not been "activated" can be dyed to very faint hues with anionic dyes by virtue of the dye receptivity of the admixed highly basic polymers, this degree of dyeing is far from acceptable for most commercial purposes, such as the manufacture of carpets, fabrics and other textile materials, packaging films and the like. In order to be able to dye these polymeric articles to commercially acceptable levels of depth of color and fastness with anionic dyes, an "activation" step as described above must be performed on these articles before dyeing or the dye bath must contain activating agents in accordance with this invention.

The dyes particularly suitable for use with this invention are the acid-type dyes, i.e. those in which the color bodies are anionic. This includes a number of categories ---
[1] Registered Trademark of E. I. du Pont de Nemours and Company, Inc.

of dyes. One of the categories of dyes included is the strong acid dyes, typified by the following:

Dimacide Light Yellow JRL
Dimacide Light Red 2B
Carbolan Brilliant Blue 2GS
Carbolan Brilliant Green 5GS
Anthraquinone Blue Sky (Color Index No. Acid Blue 78)
Kiton Fast Orange 2R (Color Index No. Acid Orange 10)

Another category of anionic dyes is the acid metallized dyes typified by the following:

Pharmalan Red GB (Color Index No. Acid Red 183)
Pharmalan Blue 2G (Color Index No. Acid Blue 158)
Palatine Yellow ELNA-CF (Color Index No. Acid Yellow 54)
Neolan Green B (Color Index No. Acid Green 12)
Neolan Orange R (Color Index No. Acid Orange 76)
Chromacyl Bordeaux R (Color Index No. Acid Red 194)

Still another category of anionic dyes is the neutral metallized dyes typified by the following:

Irgalan Yellow GL (Color Index No. Acid Yellow 114)
Capracyl Orange R (Color Index No. Acid Orange 60)
Lanasyn Brown (Color Index No. Acid Brown 19)
Isolan Red B
Lanasyn Green 2GL (Color Index designations have been provided where known)

The amount of acid required to be added to the aqueous dye bath for the purpose of this invention depends upon the properties of the particular acid used. More specifically, it is related to one or more of the following three properties of the acid: (a) acid strength (b) diffusibility of the acid into the polymeric article, and (c) ability of the acid to "hydrolyze in situ," i.e. the extent to which the activating agent will hydrolize to form one or more acidic fragments once inside to polymeric article being dyed.

In all instances in this specification, the amount of acid added to the aqueous dye bath will be expressed as the parts by weight of acid for every 100 parts by weight of the article to be dyed in the dye bath. When the article to be dyed is a fiber, the concentration of acid in the dye bath is conveniently expressed as "percent O.W.F." or percent on weight of fiber, i.e. the weight of acid in the dye bath is expressed as the percentage of the weight of fiber which is being dyed therein. Dye chemists frequently characterize the degree to which a dyeing process goes to completion as a percentage of the exhaustion of the dye bath. Thus, 50% exhaustion of the dye bath would mean that 50% of the dye originally added to the dye bath is now in the fiber or other article treated by that dye bath. In commercial usage, at least 50% exhaustion of the dye bath is considered a satisfactory level of dyeing.

The efficacy of the instant invention can be seen from the following quantitative illustration: A fiber is melt spun from a polymer mixture comprising 97% polypropylene and 3% of a copolymer prepared by polymerizing a mixture of 50% by weight 2-vinylpyridine and 50% by weight 2-methyl-5-vinylpyridine. This copolymer contains approximately 12% by weight nitrogen. This fiber is exposed to a dye bath containing an anionic dye having a molecular weight of 280. Theoretically, 100 parts of this fiber should exhaust a dye bath containing 7.5% O.W.F. of this dye. Actually, if 50% exhaustion of a 2% O.W.F. dye bath is accomplished, the result is eminently satisfactory for commercial purposes. It is neither necessary nor practical to place a dye molecule on each available nitrogen atom in order to achieve good dyeing. It can be said that the objectives of this invention are met when, in the above illustration, there is sufficient acid present in the dye bath to increase by a factor of 5 the amount of dye taken up by the fiber, i.e. when 5 times more dye is reacted with the fiber than when the technique of this invention is not used.

One class of acids which may be used to great advantage in this invention are those alpha-halo-substituted aliphatic carboxylic acids which are relatively stable to decarboxylation at the temperature of the dye bath, as for instance chloroacetic acid, dichloroacetic acid, (trichloroacetic acid tends to decarboxylate when heated), fluoroacetic acid, difluoroacetic acid, trifluoroacetic acid, bromoacetic acid, dibromoacetic acid, iodoacetic acid, diiodoacetic acid, $\alpha$-fluoropropionic acid, $\alpha$-chloropropionic acid, $\alpha$-bromopropionic acid, $\alpha$-iodopropionic acid, difluoropropionic acid, dichloropropionic acid, dibromopropionic acid, diiodopropionic acid, etc. fluorodichloropropionic acid, difluorochloropropionic acid, fluorodibromopropionic acid, difluorobromopropionic acid, fluorodiiodopropionic acid, difluoroiodopropionic acid, chlorodibromopropionic acid, dichlorobromopropionic acid, chloroiodopropionic acid, dichloroiodopropionic acid, bromodiiodopropionic acid, dibromoiodopropionic acid, fluorochlorobromopropionic acid, fluorobromoiodopropionic acid, fluorochloroiodopropionic acid, chlorobromoiodopropionic acid, fluorobutyric acid, difluorobutyric acid, trifluorobutyric acid, tetrafluorobutyric acid, pentafluorobutyric acid, hexafluorobutyric acid, chlorobutyric acid, dichlorobutyric acid, trichlorobutyric acid, tetrachlorobutyric acid, pentachlorobutyric acid, hexachlorobutyric acid, bromobutyric acid, dibromobutyric acid, tribromobutyric acid, tetrabromobutyric acid, pentabromobutyric acid, hexabromobutyric acid, iodobutyric acid, diiodobutyric acid, triiodobutyric acid, tetraiodobutyric acid, pentaiodobutyric acid, hexaiodobutyric acid and mixed halo-butyric acids having a total of between two and 6 halogen atoms per molecule. In all cases, the halo-substituted aliphatic carboxylic acid must have at least one alpha-halogen atom. Mixtures of such acids, such as the commercially available mixture of monochloroacetic and dichloroacetic acids, may also be used for this purpose.

The reason that these materials are especially desirable for use in this invention is that relatively low concentrations are effective to produce at least 50% exhaustion of the dye bath. Thus, for instance, chloroacetic acid, dichloroacetic acid and alpha-bromopropionic acid are each effective for the purpose when present in the dye bath at a level of at least 5 parts by weight for every 100 parts by weight of polymer to be treated thereby, i.e. at a concentration of 5% O.W.F. in the case of fiber dye baths.

Another group of acids used for this purpose in this invention are the non-oxidizing inorganic acids. Examples of specific acids useful in this group for the invention are sulfurous and nitrous acid. Each of these is effective for this purpose when present in the dye bath to the extent of at least approximately 20 parts by weight for each 100 parts by weight of polymeric article to be treated therein, i.e. 20% O.W.F. in fiber dye baths. Hydrochloric acid is effective for this purpose when present in the dye bath to the extent of 55 parts by weight for each 100 parts by weight of polymeric article to be treated therein, i.e. 55% O.W.F. in fiber dye baths.

Another group of acids useful for this purpose in this invention are the aliphatic carboxylic acids. Thus, for instance formic acid is effective for this purpose in this invention when present in the dye bath to the extent of at least 40 parts by weight for each 100 parts by weight of polymeric article to be treated thereby, i.e. 40% O.W.F. in the case of fiber dye baths. Acetic acid is effective for this purpose in this invention when present in the dye bath to the extent of at least approximately 200 parts by weight for every 100 parts by weight of polymer to be treated therein, or 200% O.W.F. in the case of fiber dye baths. Propionic acid can be used for the purpose of this invention and is effective therefor at a concentration of at least 200 parts by weight in the dye bath for every 100 parts by weight of polymer to be treated therein, or 200% O.W.F. in the case of fiber dye baths. Hexanoic acid and acids with more than six carbon atoms are effective for the purpose of this invention at least 20 parts by weight for every 100 parts by weight of polymer to be treated therein or 20% O.W.F. in the case of fiber dye baths.

Other substituted aliphatic carboxylic acids are also suitable for the purpose of this invention when used in the requisite concentrations in the dye bath. Thus, cyclohexylacetic acid is effective for this purpose in this invention at a concentration of 20 parts by weight per 100 parts by weight of polymer to be treated in the said dye bath, i.e. a concentration of 20% O.W.F. in the case of fiber dye baths. Glycolic acid is effective for the purposes of this invention at a concentration of 200 parts by weight per 100 parts of polymer to be treated therein i.e. 200% O.W.F. in the case of fiber dye baths.

Still another category of compounds which may be used for this purpose in the practice of this invention are halogen-containing compounds which are hydrolyzable to hydrohalic acids. It is believed that such compounds function by diffusing into the fiber or other shaped polymeric article and there hydrolyzing to form hydrohalic acid.

Typical of this category of compounds are esters of alpha-halogenated acids, as for instance methyl chloroacetate, ethyl chloroacetate, ethyl dichloroacetate, ethyl alpha-bromopropionate, isopropyl bromoacetate, n-butyl α-bromopropionate, etc. It is found necessary to introduce larger quantities of these esters into the dye bath in order to effect 50% exhaustion than of the carboxylic acids from which they are derived, since the esters lack the acidic carboxyl group. Thus, whereas the alpha-halo-substituted aliphatic carboxylic acids are effective when present in the dye bath to the extent of 5 parts per weight per 100 parts by weight of polymer to be treated therein, the ethyl esters of these acids, such as ethyl chloroacetate and ethyl bromopropionate must be added to the dye bath to the extent of approximately 80 parts by weight per 100 parts of polymer to be treated therein in order to be equally effective.

Other halogen compounds which will hydrolyze in situ to form hydrohalic acids are also effective in this invention. Activated halides such as allyl bromide or benzyl chloride are effective for the purposes of this invention when added to the dye bath to the extent of approximately 20 parts or more by weight for 100 parts of polymer to be treated therein. Acyl halides such as benzoyl chloride are effective for the purpose of this invention when added to the dye bath to the extent of approximately 10 parts or more by weight for each 100 parts of polymer to be treated therein. Ortho- and para-nitrochlorobenzene are effective for this purpose when added to the dye bath to the extent of at least 40 parts by weight for each 100 parts of polymer to be treated therein. Sulfonyl halides such as benzenesulfonyl chloride are effective for this purpose of this invention when added to the dye bath to the extent of at least 20 parts by weight for each 100 parts by weight of polymer to be treated therein.

The following examples will further serve to illustrate the nature and application of this invention.

EXAMPLE I

A mixture of 97.1% of fiber grade polypropylene and 2.9% of a copolymer containing equal parts by weight of 2-vinylpyridine and 2-methyl-5-vinylpyridine is thoroughly blended, melt-spun into fiber and then drawn at a ratio of 4 to 1 to produce a yarn of 150 filaments having a total denier of 3700. This yarn is knitted into tubing on a circular knitting machine to provide a uniform sample of fabric to subject to various dyeing conditions.

Dye baths, each containing 0.5% O.W.F. of a nonionic detergent (an ethylene oxide condensate of nonylphenol), and 2% O.W.F. of the particular dye being used, either Pharmalan Navy RLG or Capracyl Orange R are prepared. The indicated amount of the particular acid listed below is then added to the dye bath and the above-described knitted tube is immersed in the dye bath for 1 hour at 200° F. The results are as follows:

| Acid | Percent O.W.F | Dye bath exhaustion (percent) | Color depth, dyed sample |
|---|---|---|---|
| Acetic | 25 | <50 | Very pale. |
|  | 50 | <50 | Do. |
|  | 100 | <50 | Do. |
|  | 200 | 55 | Pale. |
|  | 400 | 8 | Medium. |
|  | 800 | 90 | Deep. |
| Formic | 10 | <50 | Very poor. |
|  | 20 | <50 | Pale. |
|  | 40 | 50 | Do. |
|  | 80 | 85 | Deep. |
|  | 100 | 90 | Do. |
| Hexanoic acid | 10 | <50 | Do. |
|  | 20 | 70 | Do. |
|  | 40 | 90 | Do. |
| Propionic | 200 | 75 | Light. |
|  | 400 | 90 | Deep. |
|  | 800 | 90 | Do. |
| Ethyl chloroacetate | 20 | <50 | Pale. |
|  | 40 | <50 | Do. |
|  | 80 | 55 | Medium. |
|  | 160 | 85 | Deep. |
| Ethyl bromopropionate | 20 | <50 | Very pale. |
|  | 40 | <50 | Pale. |
|  | 80 | 75 | Medium. |
| Glycolic | 50 | <50 | Very pale. |
|  | 100 | <50 | Pale. |
|  | 200 | 75 | Deep. |
| Cyclohexylacetic | 10 | <50 | Very pale. |
|  | 20 | 75 | Medium. |
|  | 40 | 90 | Medium to deep. |
| Chloracetic | 5 | 55 | Medium. |
|  | 10 | 65 | Deep. |
|  | 20 | 75 | Very deep. |
| Dichloro-acetic | 5 | 80 | Deep. |
|  | 10 | 90 | Very deep. |
| α-Bromo-propionic | 5 | 75 | Med.-deep. |
| Approximately equimolar mixture of chloroacetic and dichloro-acetic acid. | 5 | 80 | Deep. |
|  | 10 | 90 | Very deep. |
| Sulfurous | 20 | 80 | Deep. |
|  | 40 | 85 | Very deep. |
|  | 80 | 85 | Do. |
| Nitrous | 10 | <50 | Pale. |
|  | 20 | 60 | Medium. |
|  | 40 | 80 | Deep. |
| Hydrochloric | 55.5 | 85 | Do. |

EXAMPLE II

A mixture of the ethylene glycol copolyester of iso- and terephthalic acids with 2.9% of poly(2-vinylpyridine) was melt-spun into 10 filament fiber and drawn 5.5:1 to yield a yarn of 110 denier. Circular knit tubing from this yarn was dyed with Capracyl Orange R (1% O.W.F.) in a dye bath similar to that used in Example 1. The acids indicated were added to the bath, with results as listed below:

| Acid | Percent O.W.F. | Dye bath exhaustion | Color depth of dyed sample |
|---|---|---|---|
| Chloroacetic | 20 | 80 | Medium. |
|  | 40 | 90 | Deep. |
| Dichloroacetic | 10 | 90 | Med.-deep. |
|  | 20 | 75 | Deep. |
| Formic | 80 | 90 | Medium. |
| Hexanoic | 40 | 70 | Med.-deep. |
| None | | <50 | Almost colorless. |

Having thus described our invention, what we claim and desire to protect by Letters Patent is:

1. The process of dyeing an article shaped from a polymeric composition comprising (a) an inherently undyeable polymer selected from the class consisting of polyolefins or polyesters in admixture with (b) from 0.5 to 10% of thermoplastic basic nitrogen containing dye receptor polymer; said process comprising exposing said article to an aqueous dye bath containing an anionic dye in sufficient concentration to achieve the desired level of dyeing of said article, and an acidic reagent selected from the group consisting of:

(a) Unsubstituted aliphatic and cycloaliphatic monocarboxylic acids;
(b) halo-substituted aliphatic monocarboxylic acids and mixtures thereof;
(c) hydroxy substituted aliphatic monocarboxylic acids;
(d) halogen-containing compounds which are hydrolyzable in aqueous medium to form hydrohalic acid;
(e) nitrous acid
(f) sulfurous acid
(g) hydrochloric acid, or
(h) carbolic acid, said acidic reagent being of sufficient concentration to achieve at least a 50% exhaustion of the dye in said aqueous dye bath during the dyeing of said article.

2. The process of claim 1 wherein said reagent is a water soluble unsubstituted aliphatic monocarboxylic acid.

3. The process of claim 2 wherein said dye bath contains at least 20 parts by weight of hexanoic acid per 100 parts by weight of said article exposed thereto.

4. The process of claim 2 wherein said dye bath contains at least 40 parts by weight of formic acid per 100 parts by weight of said article exposed thereto.

5. The process of claim 2 wherein said dye bath contains at least 200 parts by weight of propionic acid per 100 parts by weight of said article exposed thereto.

6. The process of claim 2 wherein said dye bath contains at least 400 parts by weight of acetic acid per 100 parts by weight of said article exposed thereto.

7. The process of claim 1 wherein said acidic agent is a halogen-containing compound which is hydrolyzable in aqueous medium to form a hydrohalic acid.

8. The process of claim 7 wherein said dye bath contains at least 80 parts by weight of ethyl bromopropionate for each 100 parts by weight of said article exposed thereto.

9. The process of claim 7 wherein said dye bath contains at least 80 parts by weight of ethyl chloracetate for each 100 parts by weight of said article exposed thereto.

10. The process of claim 1 wherein said acidic reagent is a water soluble substituted carboxylic acid.

11. The process of claim 1 wherein said dye bath contains at least 20 parts by weight of cyclohexylacetic acid per 100 parts by weight of said article exposed thereto.

12. The process of claim 1 wherein said dye bath contains at least 200 parts by weight of glycolic acid per 100 parts by weight of said article exposed thereto.

13. The process of claim 1 wherein said dye bath contains at least 80 parts by weight of carbolic acid per 100 parts by weight of said article exposed thereto.

14. The process of claim 1 wherein said dye bath contains at least 20 parts by weight of benzyl chloride per 100 parts by weight of said article exposed thereto.

15. The process of claim 1 wherein said dye bath contains at least 40 parts by weight of p-nitro chlorobenzene perr 100 parts by weight of said article exposed thereto.

16. The process of claim 1 wherein said dye bath contains at least 20 parts by weight of benzenesulfonyl chloride per 100 parts by weight of said article exposed thereto.

17. The process of claim 1 wherein said halo-substituted aliphatic carboxylic acid is selected from the group consisting of monochloroacetic acid, dichloroacetic acid, alpha-bromopropionic acid and mixtures of any of the members of said group.

18. The process of dyeing an article shaped from a polymeric composition comprising from 90 to 99.5% of an inherently undyeable polymer selected from the class consisting of polyolefins or polyesters in admixture with correspondingly, from 0.5% to 10% of a thermoplastic basic nitrogen containing dye receptor polymer, said process comprising exposing said article to an aqueous dye bath containing an anionic dye in sufficient concentration to achieve the desired level of dyeing of said article, and at least 5 parts by weight of an alpha-halo-substituted aliphatic carboxylic acid for every 100 parts by weight of said article exposed thereto.

19. The process of claim 18 wherein said acid is monochloroacetic acid.

20. The process of claim 18 wherein said acid is dichloroacetic acid.

21. The process of claim 18 wherein said acid is α-bromopropionic acid.

22. The process of claim 18 wherein said acid is a mixture of monochloroacetic acid and dichloroacetic acid.

23. The process of dyeing a fiber comprising from 90 to 99.5% polypropylene in admixture with correspondingly, from 0.5 to 10% of a thermoplastic dye receptor polymer of at least one vinylpyridine compound comprising exposing said fiber to a dye bath containing an anionic dye in sufficient concentration to achieve the desired level of dyeing of said fiber and at least 5 percent O.W.F. of an alpha-halo-substituted aliphatic carboxylic acid.

24. The process of claim 6 wherein said acid is α-bromopropionic acid.

25. The process of claim 6 wherein said acid is dichloroacetic acid.

26. The process of claim 6 wherein said acid is a mixture of monochloroacetic acid and dichloroacetic acid.

27. The process of dyeing a fiber comprising from 90 to 99.5% polyester in admixture with correspondingly, from 0.5 to 10% of a thermoplastic dye receptor polymer of at least one vinylpyridine compound comprising exposing said fiber to a dye bath containing an anionic dye in sufficient concentration to achieve the desired level of dyeing of said fiber and at least 5 percent O.W.F. of an alpha-halo-substituted aliphatic carboxylic acid.

28. The process of claim 11 wherein said acid is monochloroacetic acid.

29. The process of claim 11 wherein said acid is dichloroacetic acid.

30. The process of claim 11 wherein said acid is α-bromopropionic acid.

31. The process of dyeing an article shaped from a polymeric composition comprising from 90 to 99.5% of an inherently undyeable polymer selected from the class consisting of polyolefins or polyesters in admixture with correspondingly, from 0.5% to 10% of a thermoplastic basic nitrogen containing dye receptor polymer, said process comprising exposing said article to an aqueous dye bath containing an anionic dye in sufficient concentration to achieve the desired level of dyeing of said article and a non-oxidizing inorganic acid selected from the group consisting of at least 20 parts by weight nitrous acid or sulfurous acid; or at least 55 parts by weight hydrochloric acid.

References Cited

UNITED STATES PATENTS

| 3,432,250 | 3/1969 | Miller et al. |
| 3,439,066 | 8/1969 | Coover et al. |
| 3,439,999 | 4/1969 | Miller et al. |
| 3,361,843 | 1/1968 | Miller et al. _____ 260—857 |

OTHER REFERENCES

Louis Diserens, "Chem. Tech. of Dyeing and Printing," Vol. 11, Reinhold Publishing Co., New York, 1951, pp. 311, 315, 316.

NORMAN G. TORCHIN, Primary Examiner

J. E. CALLAGHAN, Assistant Examiner

U.S. Cl. X.R.

8—55